United States Patent [19]

Gardeck et al.

[11] Patent Number: 5,325,432
[45] Date of Patent: Jun. 28, 1994

[54] METHOD FOR UPDATING ENCRYPTION KEY INFORMATION IN COMMUNICATION UNITS

[75] Inventors: Kevin Gardeck, Algonquin; Kevin M. Cutts, Schaumburg, both of Ill.

[73] Assignee: Motorola, Inc., Schaumburg, Ill.

[21] Appl. No.: 13,393

[22] Filed: Feb. 4, 1993

[51] Int. Cl.⁵ .............................................. H04L 9/00
[52] U.S. Cl. ...................................... 380/21; 380/45; 380/47
[58] Field of Search .............................. 380/21, 45, 47

[56] References Cited

U.S. PATENT DOCUMENTS

| | | | |
|---|---|---|---|
| 5,146,497 | 9/1992 | Bright | 380/21 |
| 5,208,859 | 5/1993 | Bartucci et al. | 380/21 |
| 5,216,715 | 6/1993 | Markwitz | 380/21 |

Primary Examiner—David C. Cain
Attorney, Agent, or Firm—Timothy W. Markison

[57] ABSTRACT

Within a communication system, an encryption controller receives unit identification information from a plurality of encrypting/decrypting communication units. For any individual communication unit, the encryption controller uses the unit identification associated with that transmitting communication unit to determine if it contains updated encryption key information. If the transmitting communication unit is not currently updated, a group call is used to send the current encryption key information to all communication units within the transmitting communication unit's group, thereby updating all active, non-current communication units. After a first predetermined period of time has elapsed, this process is allowed to repeat.

6 Claims, 2 Drawing Sheets

METHOD FOR UPDATING ENCRYPTION KEY INFORMATION IN COMMUNICATION UNITS

FIELD OF THE INVENTION

The present invention relates generally to communication units, and in particular, to updating the communication unit's encryption key information.

BACKGROUND OF THE INVENTION

Communication systems are known to comprise mobile transmitters and receivers, such as in-car mobile or hand-held portable radios (mobiles), as well as fixed transmitters and fixed receivers, such as base stations or controllers (fixed end). A typical message within such a communication system may begin with a mobile unit converting an audio signal into a digital data stream suitable for transmission over an RF channel to either another mobile unit or the fixed end. Such systems are often used by public safety institutions, such as local or federal law enforcement agencies. The existence of commercially available radio frequency scanners makes it possible for unauthorized parties to monitor the information transmitted within such a communication system. To reduce unauthorized eavesdropping, communication systems encrypt communications such that, without knowledge of the encryption method and a decryptor, the communications are unintelligible.

As is known, digital encryption methods use a reversible algorithm to introduce randomness into a digital data stream. An algorithm that randomizes digital data is called an encryptor; that which reconstructs the original data from the randomized data, a decryptor. An encryptor/decryptor algorithm typically utilizes dynamic parameters, hereafter referred to as keys, to uniquely specify the nature of the randomness introduced to the digital data stream. Thus, only encryptors and decryptors utilizing an identical algorithm and key are capable of reproducing intelligible messages. To further maintain security, the keys used within such a system are periodically changed, often called rekeying. This must be done in an efficient manner to ensure that all elements within the system are capable of communication with one another.

The use of external devices to change encryption key information within individual communication units is known. Such methods require that each communication unit be brought in from the field for rekeying by a technician. Obviously, this could be impractical in a system with thousands of communication units.

Another method of rekeying communication units is over-the-air rekeying (OTAR). OTAR sends messages which contain the required encryption key information over an RF (radio frequency) channel to each unit. In this way, it is not necessary to co-locate each communication unit with an external rekeying device. In addition, it is also known to use a single, group-wide message to rekey all communication units within a group at once, referred to as group OTAR. Group OTAR is effective if all communication units are within the system's coverage area and are powered-up. If there are communication units that are out of range or powered-down at the time of the group OTAR call, they will not be rekeyed. Therefore, a need exists for a method which allows communication units that were excluded from a group OTAR message to be rekeyed, thus ensuring greater concurrence of encryption key information among all communication units within a system.

DESCRIPTION OF A PREFERRED EMBODIMENT

The present invention provides a method that allows group-wide updating of encryption key information. This is accomplished by tracking the status of communication units with respect to encryption key information. When a communication unit makes itself known to the system, a data base is referenced to determine if the communication unit has the correct encryption key information. If it does not, a group message is sent which contains the necessary encryption key information to update the communication unit and any communication unit in the group that did not have the updated encryption key information.

Figure 1:
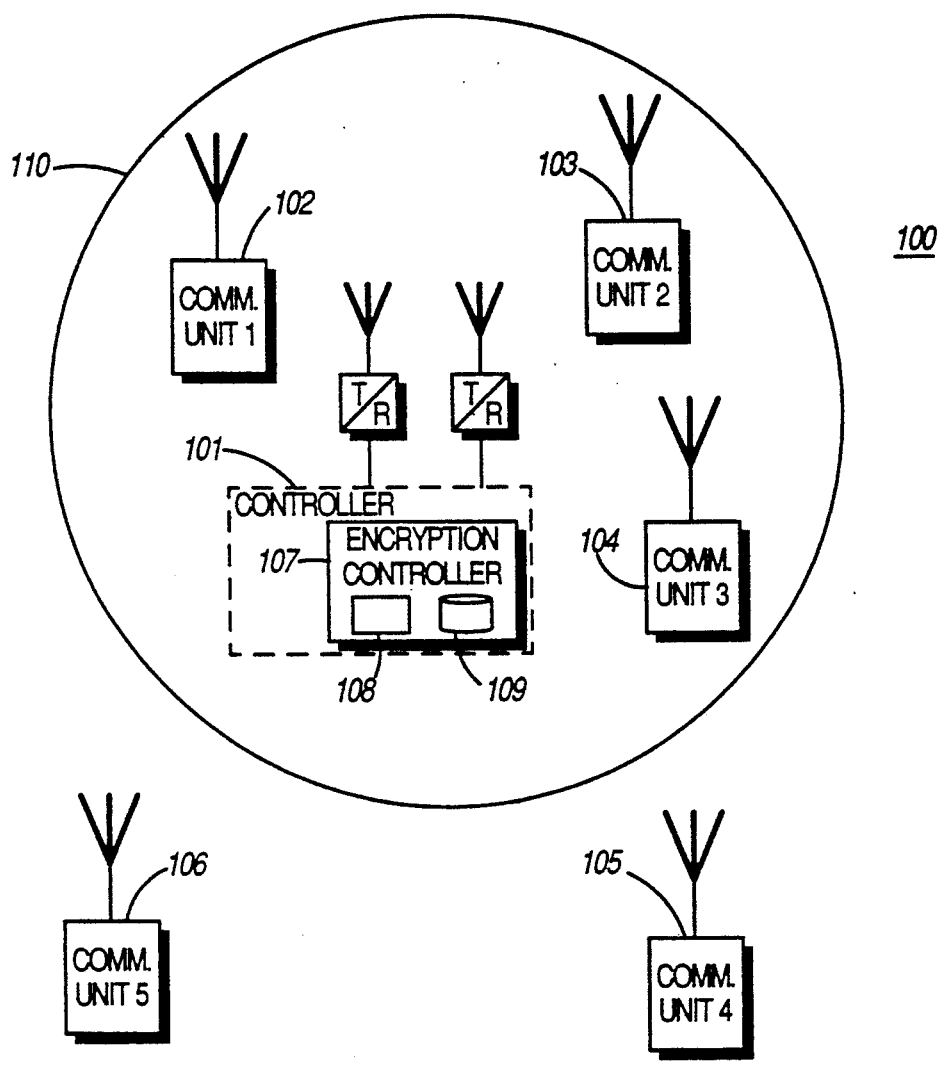
FIG. 1 illustrates a communication system in accordance with the present invention.

The present invention can be more fully described with reference to FIGS. 1 and 2. FIG. 1 illustrates a communication system 100 that includes a controller 101, a plurality of communication units 102–106, an encryption controller 107, a microprocessor 108, memory 109, and a coverage area 110. The encryption controller 107 may comprise a Motorola Key Management Controller (TDN8762A). The microprocessor 108 may comprise an MC68030 microprocessor board (MVME147FSA-1-4). The memory 109 may comprise RAM located on the microprocessor board and/or a Computer Hard Disk (MVME864F-4-4. The communication units 102, 103, 104, 105, and 106 may comprise in-hand portable units (Motorola Model H44TUK5170CN) or in-car mobile units (Motorola Model D43KXA7JA7BK) capable of encrypted two-way communications.

Within a communication system, sets of communication units can be partitioned into various groups. Thus, it is common practice to initiate group calls. A group call is a transmission that is received only by those communication units within a particular group. For instance, a law enforcement agency may choose to separate communication units used by drug enforcement officers into a different group than those used by homicide officers. For the purpose of describing the present invention, it is assumed that the communication units 102-106 are within the same group.

Within their group, the communication units 102–106 can be further subdivided into two sets: those that are active and those that are inactive. The first set of communication units, comprising active units, are considered to be powered-up radios within the coverage area 110 of the controller 101. The second set of communication units, comprising inactive units, are considered to be either powered-down radios or radios, in either power state, outside the coverage area 110 of the controller 101. For example, the communication units 102 and 103 are powered-on and are in the first set of communication units. The communication units 105 and 106 are out of range and are in the second set of communication units. The communication unit 104 is in range but powered-off and is thus in the second set of communication units. It is important to note that communication units in either the first or second set may or may not contain updated encryption key information.

It is obvious that communication units from the first set can change to the second set at any time by powering down or moving out of range. Conversely, communication units from the second set can change to the first set by powering-up within the coverage area 110, or by moving into the coverage area 110. Once powered-up and within the coverage area 110, the communication unit transmits its unique identification code (unit ID). In a preferred embodiment, the unit ID is a unique, 16-bit binary number associated with each communication unit within the communication system. It is understood that the unit ID can comprise any number of bits dependant upon the requirements of the communication system. The encryption controller 107 uses the unit ID to determine the status of each particular communication unit's encryption key information. When the encryption controller 107 encounters a communication unit that does not contain updated encryption key information, it can initiate, via the controller 101, a group message containing the updated encryption key information to all the communication units currently in the first set, thereby ensuring that all such units are updated. This process can be repeated each time a non-current communication unit is recognized by the encryption controller. FIG. 2 describes this process in further detail.

Figure 2:
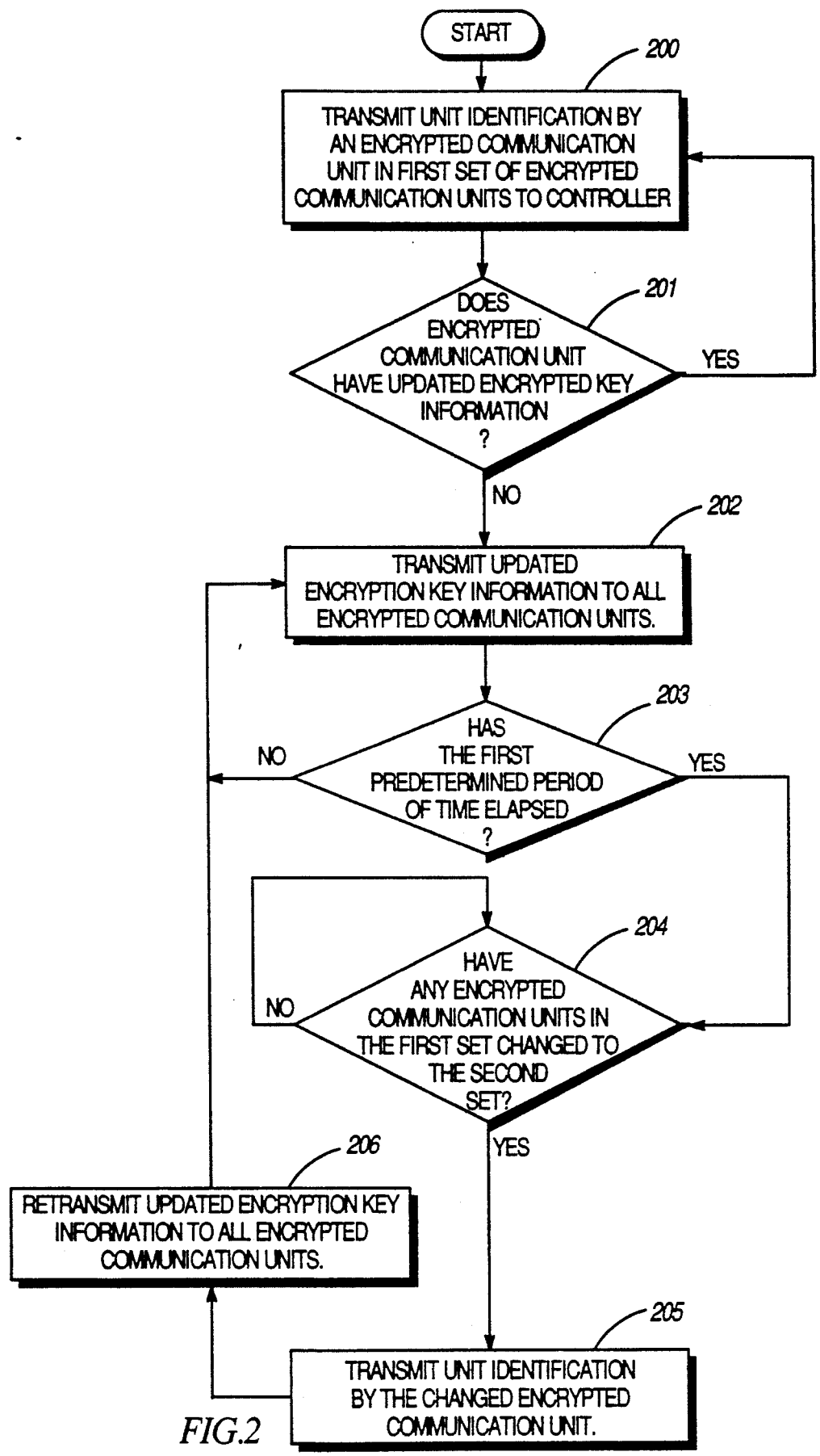
FIG. 2 illustrates a logic diagram that may be used to implement the present invention.

FIG. 2 illustrates a logic diagram that the encryption controller 107 may perform to implement the present invention. At step 200, a transmission occurs from a communication unit in the first set. The unit ID associated with the transmitting communication unit is used, at step 201, to determine the status of the transmitting communication unit's encryption key information. For the present invention, encryption key information includes all key data needed by a communication unit to perform encryption and decryption of messages within its group. Determination of the status of the transmitting communication unit's encryption key information is accomplished by using the received unit ID to index a record in the memory 109 of the encryption controller 107. This record will contain a field which indicates the transmitting communication unit's encryption key information status. If the transmitting communication unit is currently updated, no action is necessary and the encryption controller 107 Can wait for another transmission from a communication unit. If, however, it determines that the transmitting communication unit does not have the correct or updated encryption key information, processing continues to step 202 where the current encryption key information is transmitted to the transmitting communication unit via a group call. A group call is used to ensure that all active communication units within the the transmitting communication unit's group will receive the correct encryption key information. The process of transmitting a group call via the controller is known, thus no further discussion will be presented.

At this point in the process, it is evident that such group calls could significantly add to the message traffic within the communication system if repeated each time a non-current communication unit transmits its unit ID. To minimize such traffic, the encryption controller 101 ascertains, at step 203, whether a predetermined wait period has elapsed since the updated encryption key information was last transmitted. In a preferred embodiment, this predetermined wait period is approximately fifteen minutes. It is understood that the predetermined wait period can be set to any duration, depending on the communication system. By limiting how often the encryption key information will be transmitted, the communication system 100 will not be saturated with outbound updating transmissions.

Once the predetermined wait period of time has elapsed 203, have any communication units with outdated encryption key information in the second set changed to the first set 204. Note that transitions from the first set to the second set and vice versa can take place anytime during or after the predetermined wait period. Once at least one non-current communication unit has changed sets, the process continues to steps 205 and 206, which are analogous to steps 200 and 202, respectively. Once again, the current encryption key information is transmitted to the newly-active communication unit via a group call. As before, the use of a group call to rekey any particular communication unit ensures that all communication units that have changed to an active state since the last group call will be updated. Finally, the predetermined wait period must once again elapse before any further group calls, with the purpose of updating non-current communication units, are made. By constant repetition of this process, virtually all communication units within a particular group can be updated in an efficient manner.

After a first predetermined period of time, typically days, the encryption controller 107 may revert to a unit rekeying basis, as opposed to a group rekeying basis. Unit rekeying causes a communication unit to have its encryption key information updated through a unit call rather than a group call. To illustrate, if the encryption key information for a particular group is changed once a week, it may be desirable to set the first predetermined period of time to three days, for example. Thus, after three days have elapsed since updating the encryption key information, any communication units found to be non-current can be updated with a unit rekey call, thereby minimizing system traffic. As an alternate method, the encryption controller waits to switch to a unit rekeying basis until after a certain percentage of communication units within a particular group have been updated. The use of either method is dependant upon the requirements of the communication system.

As mentioned previously, it may be desired to periodically change the encryption key information used within a communication system. The present invention anticipates the ability to enter such information through two general methods. In the first, a user may interface with the encryption controller and manually enter the new encryption key information. This can be done either through a keyboard or with an external keyloading device, as are known in the art. In the second, the encryption controller is programmed to automatically select random encryption keys after a second predetermined period of time (typically one or two weeks) and update the encryption keys. This method of operation requires less human intervention and increases the overall security of the system.

In summary, present invention provides a method for efficiently updating encryption key information on a group basis. By allowing individual non-current communication units to initiate the updating of all non-current communication units within the group, the present invention reduces the need for operator intervention required to accomplish this task. Rather than simply rekeying individual communication units as they become available, it also rekeys other communications units that may be simply monitoring the same RF channels. This leads to a higher percentage of communication units with correct encryption key information and, therefore, a higher percentage of communication units that can communicate securely.

We claim:

1. In a communication system that includes a plurality of communication units, an encryption controller, wherein the plurality of communication units includes a first set of communication units that are currently active and a second set of communication units that are currently inactive and wherein communication units of the plurality of communication units readily change from the first set of communication units to the second set of communication units and vice versa, a method for updating encryption key information to the plurality of communication units, the method comprises the steps of:
   a) transmitting, by a first communication unit in the first set of communication units, unit identification information to the encryption controller;
   b) when the unit identification information is received, determining, by the encryption controller, that the first communication unit does not have updated encryption key information;
   c) transmitting, by the encryption controller, updated encryption key information to the plurality of communication units, wherein only the first set of communication units are updated with the updated encryption key information;
   d) initiating, by the encryption controller, a predetermined wait period;
   e) changing, by a second communication unit, from the second set of communication units to the first set of communication units;
   f) after expiration of the predetermined wait period, receiving, by the encryption controller, unit identification information from the second communication unit; and
   g) when the unit identification information from the second communication unit is received, retransmitting, by the encryption controller, the updated key information to the plurality of communication units, wherein communication units that have changed from the second set of communication units to the first set of communication units are updated with the updated encryption key information.

2. The method of claim 1 further comprises the steps of:
   h) changing, by a third communication unit, from the second set of communication units to the first set of communication units;
   i) receiving, by the encryption controller, unit identification information from the third communication unit; and
   j) when the unit identification information from the third communication unit is received, retransmitting, by the encryption controller, the updated key information only to the third communication unit after a first predetermined period of time elapses, wherein the first predetermined period of time is at least a factor of 10 greater than the predetermined wait period.

3. In the method of claim 1, step (c) further comprises changing the updated encryption key information automatically after a second predetermined period of time elapses.

4. In a communication system that includes a plurality of communication units, an encryption controller, wherein the plurality of communication units includes a first set of communication units that are currently active and a second set of communication units that are currently inactive and wherein communication units of the plurality of communication units readily change from the first set of communication units to the second set of communication units and vice versa, a method for updating encryption key information to the plurality of communication units, the method comprises the steps of:
   a) receiving, by the encyption controller, unit identification information from a first communication unit in the first set of communication units;
   b) determining, by the encryption controller, that the first communication unit does not have updated encryption key information;
   c) transmitting, by the encryption controller, updated encryption key information to the plurality of communication units, wherein only the first set of communication units are updated with the updated encryption key information;
   d) initiating, by the encryption controller, a predetermined wait period;
   e) after expiration of the predetermined wait period, receiving, by the encryption controller, unit identification information from a second communication unit, wherein the second communication unit has changed from the second set of communication units to the first set of communication units; and
   f) retransmitting, by the encryption controller, the updated key information to the plurality of communication units, wherein communication units that have changed from the second set of communication units to the first set of communication units are updated with the updated encryption key information.

5. The method of claim 4 further comprises the steps of:
   h) changing, by a third communication unit, from the second set of communication units to the first set of communication units;
   i) receiving, by the encryption controller, unit identification information from the third communication unit; and
   j) when the unit identification information from the third communication unit is received, retransmitting, by the encryption controller, the updated key information only to the third communication unit after a first predetermined period of time elapses, wherein the first predetermined period of time is at least a factor of 10 greater than the first predetermined period of time.

6. In the method of claim 4, step (c) further comprises changing the updated encryption key information automatically after a second predetermined period of time elapses.

* * * * *